(12) United States Patent
Kinoshita

(10) Patent No.: US 11,122,185 B2
(45) Date of Patent: Sep. 14, 2021

(54) INFORMATION PROCESSING SYSTEM, IMAGE FORMING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Yosuke Kinoshita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 88 days.

(21) Appl. No.: 16/111,221

(22) Filed: Aug. 24, 2018

(65) Prior Publication Data
US 2019/0068836 A1    Feb. 28, 2019

(30) Foreign Application Priority Data

Aug. 31, 2017    (JP) .............................. JP2017-167270

(51) Int. Cl.
*G06F 3/12* (2006.01)
*G06Q 10/08* (2012.01)
*H04N 1/44* (2006.01)

(52) U.S. Cl.
CPC ......... *H04N 1/4433* (2013.01); *G06F 3/1205* (2013.01); *G06F 3/1222* (2013.01); *G06F 3/1238* (2013.01); *G06F 3/1261* (2013.01); *G06F 3/1288* (2013.01)

(58) Field of Classification Search
CPC .... G06F 3/1238; G06F 3/1261; G06F 3/1275; G06F 3/1205; G06F 3/1285; G06F 3/1222; G06F 3/1288; H04N 1/4433

USPC ........................................................ 358/1.13
See application file for complete search history.

(56) References Cited

U.S. PATENT DOCUMENTS

| 8,208,153 B2 | 6/2012 | Minami et al. |
| 2007/0247661 A1* | 10/2007 | Minami ............. H04N 1/00347 358/1.15 |
| 2008/0201374 A1* | 8/2008 | Oya ...................... G06Q 10/087 |
| 2011/0286022 A1* | 11/2011 | Kakitsuba ............. G06F 3/1232 358/1.13 |
| 2012/0096451 A1* | 4/2012 | Tenbarge ............ G06F 11/1433 717/170 |

(Continued)

FOREIGN PATENT DOCUMENTS

| JP | H10157253 | 6/1998 |
| JP | 2007295077 | 11/2007 |

(Continued)

OTHER PUBLICATIONS

"Office Action of Japan Counterpart Application", dated Apr. 20, 2021, with English translation thereof, pp. 1-13.

*Primary Examiner* — Marcellus J Augustin
(74) *Attorney, Agent, or Firm* — JCIPRNET

(57) ABSTRACT

An information processing system includes an acquisition unit and a replacement unit. The acquisition unit acquires first level information indicating a level of a function of a first apparatus and second level information indicating a level of the function of a second apparatus. The replacement unit replaces the function of the second apparatus with the function of the first apparatus, in a case where the level indicated by the first level information acquired by the acquisition unit is higher than the level indicated by the second level information.

15 Claims, 15 Drawing Sheets

(56) References Cited

U.S. PATENT DOCUMENTS

2015/0212764 A1* 7/2015 Maruo ................. G06F 3/1203
  358/1.15
2017/0322753 A1* 11/2017 Feng .................. H04N 1/00127

FOREIGN PATENT DOCUMENTS

| JP | 4985190 | * | 7/2012 | ............. | B41J 29/38 |
| JP | 2014144566 | | 8/2014 | | |

* cited by examiner

FIG. 5

```xml
<?xml version="1.0"?>
<soap:Envelope xmlns:soap="http://schemas.xmlsoap.org/soap/envelope/" xmlns:xsi="http://www.w3.org/2001/XMLSchema-instance">
 <soap:Header>
   <Info version="1.0.0">
     <Name>Cloud Transfer Execution<Name>
     <Description>Cloud Transfer<Description>
     <CreatedDate>2017-05-22T15:27:47+09:00</CreatedDate>
   </Info>
 </soap:Header>
 <soap:Body>
   <Request>
    <Mailbox>
      <Source>
        <Scanner/>
        <Fax/>
      </Source>
    </Mailbox>
    <Distribution>
     <Serialization>
       <Format>JPEG</Format>
     </Serialization>
     <TransferDestinations>
       <Target>https://sample.cloud.com/myfolders/1</Target>
       <Parameters>
         <DocParams>
           <DocParam>
             <Name>sample.jpg</Name>
           </DocParam>
          </DocParams>
         <Authentication>
           <UserID>12345</UserID>
           <Password>abcdefg</Password>
         </Authentication>
       </Parameters>
     </TransferDestinations>
    </Distribution>
   </Request>
 </soap:Body>
</soap:Envelope>
```

FIG. 10

| ENCRYPTION ALGORITHM | SCORE | EXISTING APPARATUS | NEW APPARATUS |
|---|---|---|---|
| RSA_WITH_RC4_SHA | 1 | PRESENCE | ABSENCE |
| RSA_WITH_DES_CBC_SHA | 2 | PRESENCE | ABSENCE |
| RSA_WITH_3DES_EDE_CBC_SHA | 3 | PRESENCE | PRESENCE |
| RSA_WITH_AES_128_CBC_SHA | 4 | ABSENCE | PRESENCE |
| RSA_WITH_AES_256_CBC_SHA | 5 | ABSENCE | PRESENCE |

WEAK → STRONG

INFORMATION PROCESSING SYSTEM, IMAGE FORMING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-167270 filed Aug. 31, 2017.

BACKGROUND

Technical Field

The present invention relates to an information processing system, an image forming system, and a non-transitory computer readable medium storing a program.

SUMMARY

According to an aspect of the invention, there is provided an information processing system including an acquisition unit that acquires first level information indicating a level of a function of a first apparatus and second level information indicating a level of the function of a second apparatus; and a replacement unit that replaces the function of the second apparatus with the function of the first apparatus, in a case where the level indicated by the first level information acquired by the acquisition unit is higher than the level indicated by the second level information.

BRIEF DESCRIPTION OF THE DRAWINGS

Exemplary embodiment(s) of the present invention will be described in detail based on the following figures, wherein:

FIG. 5 shows an example of the instruction sheet according to the present exemplary embodiment;

FIG. 10 is a schematic diagram showing an example of a comparison table according to the present exemplary embodiment;

DETAILED DESCRIPTION

Hereinafter, exemplary embodiments will be described in detail, with reference to the drawings.

First Exemplary Embodiment

Figure 1:
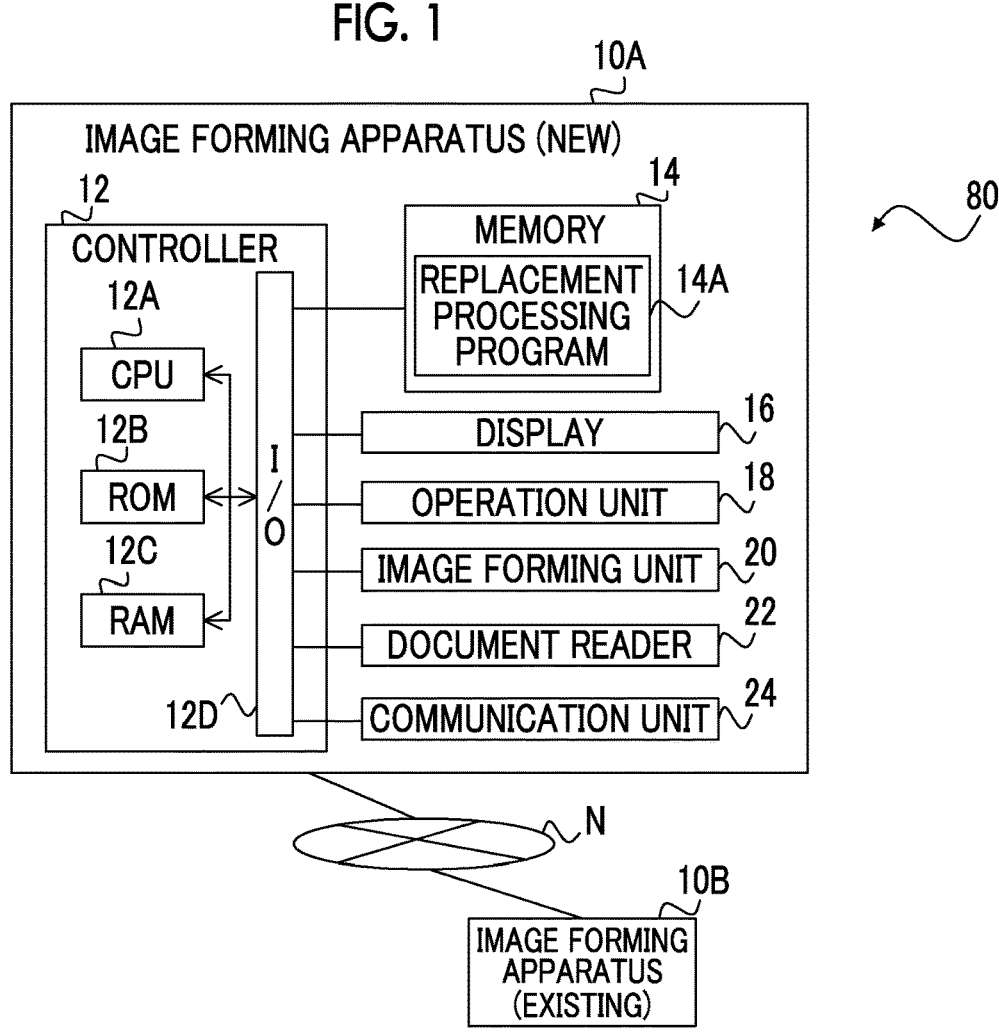
FIG. 1 is a block diagram illustrating an example of a configuration of an image forming system according to a first exemplary embodiment.

FIG. 1 is a block diagram illustrating an example of a configuration of an image forming system 80 according to a first exemplary embodiment.

As illustrated in FIG. 1, the image forming system 80 according to the present exemplary embodiment is an example of an information processing system, and includes an image forming apparatus 10A and an image forming apparatus 10B.

In the present exemplary embodiment, the image forming apparatus 10A is a new apparatus newly connected to a network N, and the image forming apparatus 10B is an existing apparatus already connected to the network N. The image forming apparatus 10A is an example of a first apparatus and a first image forming apparatus, and the image forming apparatus 10B is an example of a second apparatus and a second image forming apparatus.

Hereinafter, in the present exemplary embodiment, the case where the function of the image forming apparatus 10B is replaced by the function of the image forming apparatus 10A will be described. However, the function of the image forming apparatus 10A may be replaced by the function of the image forming apparatus 10B. In addition, although the image forming apparatus is exemplified and described in the present exemplary embodiment, the present invention can be similarly applied to various apparatuses such as a server computer and a personal computer (PC) having mutually replaceable functions, for example.

The image forming apparatus 10A according to the present exemplary embodiment includes a controller 12, a memory 14, a display 16, an operation unit 18, an image forming unit 20, a document reader 22, and a communication unit 24.

The controller 12 includes a central processing unit (CPU) 12A, a read only memory (ROM) 12B, a random access memory (RAM) 12C, and an input and output interface (I/O) 12D, and these units are connected to each other through a bus.

Functional units including the memory 14, the display 16, the operation unit 18, the image forming unit 20, the document reader 22, and the communication unit 24 are connected to the I/O 12D. These functional units may mutually communicate with the CPU 12A through the I/O 12D.

The controller 12 may be configured as a part of a major controller that controls the overall operation of the image forming apparatus 10. For some or all of each block of the controller 12, for example, an integrated circuit such as a large scale integration (LSI) or an integrated circuit (IC) chip set is used. Individual circuits may be used for each of the above blocks, or a circuit in which some or all of the blocks are integrated may be used. The blocks may be provided as one body or some blocks may be provided separately. Further, in each of the above blocks, some thereof may be separately provided. For integration of the controller 12, not only LSI but also a dedicated circuit or a general-purpose processor may be used.

As the memory 14, for example, a hard disk drive (HDD), a solid state drive (SSD), a flash memory, or the like is used. The replacement processing program 14A is stored in the memory 14. Note that the replacement processing program 14A may be stored in the ROM 12B.

The replacement processing program 14A may be installed in the image forming apparatus 10A in advance, for example. The replacement processing program 14A may be stored in a nonvolatile storage medium or distributed through a network and may be implemented by being installed in the image forming apparatus 10A appropriately. Examples of nonvolatile storage medium are a CD-ROM, a magneto-optical disk, an HDD, a DVD-ROM, a flash memory, a memory card, or the like.

As the display 16, for example, a liquid crystal display (LCD), an organic electro luminescence (EL) display, or the like is used. The display 16 integrally has a touch panel. The operation unit 18 is provided with various operation keys such as ten keys and a start key. The display 16 and the operation unit 18 receive various instructions from the user of image forming apparatus 10A. Examples of these various instructions include an instruction to start reading the document, an instruction to start copying the document, and the like. The display 16 displays various types of information such as a result of a process executed in response to an instruction received from the user and a notification on a process.

The document reader 22 takes in documents one by one placed on a feed table of an automatic document feeder (not shown) provided at the upper part of the image forming apparatus 10A, optically reads the taken document to obtain image information. Alternatively, the document reader 22 optically reads a document placed on a document platen such as platen glass to obtain image information.

The image forming unit 20 forms an image based on image information obtained by reading by the document reader 22 or image information obtained from an external PC or the like connected through the network N onto a recording medium such as paper. In the present exemplary embodiment, an electrophotographic method is exemplified as a method of forming an image, but other methods such as an inkjet method may be adopted.

In the case where the method of forming an image is an electrophotographic method, the image forming unit 20 includes a photosensitive drum, a charging unit, an exposure unit, a developing unit, a transfer unit, and a fixing unit. The charging unit charges the surface of the photosensitive drum by applying a voltage to the photosensitive drum. The exposure unit forms an electrostatic latent image on the photosensitive drum by exposing the photosensitive drum charged by the charging unit with light according to image information. The developing unit forms a toner image on the photosensitive drum by developing the electrostatic latent image formed on the photosensitive drum with toner. The transfer unit transfers the toner image formed on the photosensitive drum onto the recording medium. The fixing unit fixes the toner image transferred onto the recording medium by heating and pressing.

The communication unit 24 is connected to a network N such as a local area network (LAN) and a wide area network (WAN), and is capable of communicating with the image forming apparatus 10B through the network N. In this example, the communication unit 24 and the network N are connected by wires, but may be wirelessly connected.

However, in a case of comparing the function of the new image forming apparatus 10A with the same function of the existing image forming apparatus 10B, the levels of the function may be different from each other. For example, the level of the function of the image forming apparatus 10A may be higher than the level of the function of the image forming apparatus 10B. In such a case, for example, replacing the function of the image forming apparatus 10B with the same function of the image forming apparatus 10A makes it possible to more effectively utilize the retained function as compared with the case where the function is not replaced, which is considered desirable.

Figure 2:
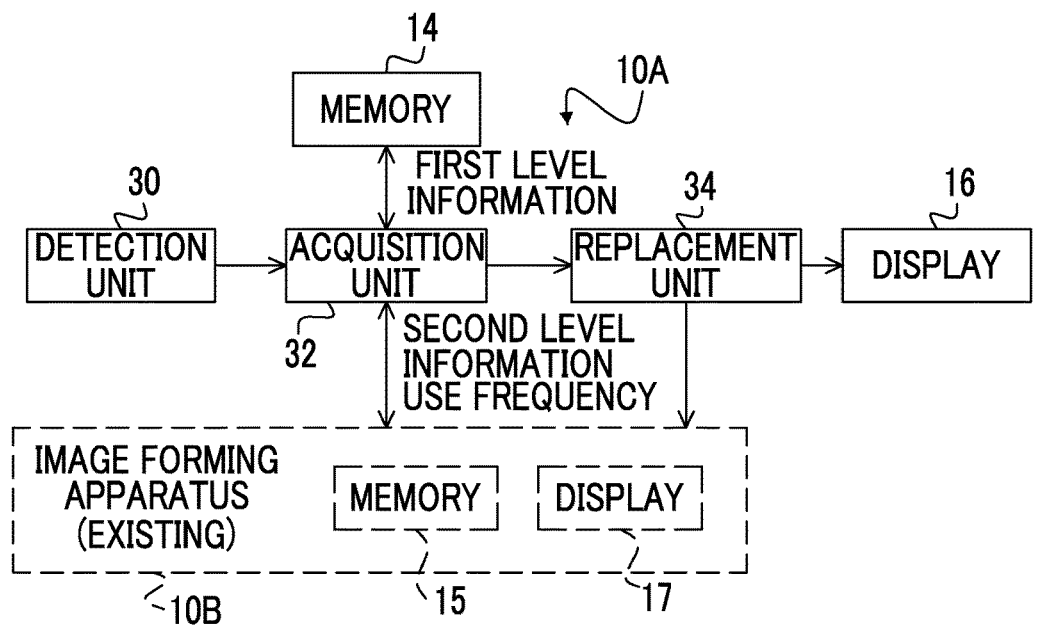
FIG. 2 is a block diagram illustrating an example of a functional configuration of the image forming apparatus according to the first exemplary embodiment.

Therefore, the CPU 12A of the image forming apparatus 10A according to the present exemplary embodiment functions as each of units shown in FIG. 2 by writing the replacement processing program 14A stored in the memory 14 to the RAM 12C and executing it.

FIG. 2 is a block diagram illustrating an example of a functional configuration of the image forming apparatus 10A according to the first exemplary embodiment.

As shown in FIG. 2, the CPU 12A of the image forming apparatus 10A according to the present exemplary embodiment functions as a detection unit 30, an acquisition unit 32, and a replacement unit 34.

The detection unit 30 detects the existing image forming apparatus 10B connected to the network N. For example, in the case of an image forming apparatus of the same maker, since compatibility of the control software is normally secured, information exchange is possible through the network N. In other words, in a case where the image forming apparatus 10B is produced by the same manufacturer as that of the image forming apparatus 10A, it can be easily detected. However, even in a case where the image forming apparatus 10B is produced by a manufacturer different from that of the image forming apparatus 10A, in a case where compatibility of control software is secured, it is possible to detect it.

The acquisition unit 32 acquires first level information indicating the level of the function of the image forming apparatus 10A, and second level information indicating the level of the same function of the image forming apparatus 10B. The function referred to herein is a function that can be replaced between the image forming apparatus 10A and the image forming apparatus 10B. Examples thereof include an encrypted communication function to be described later, a printing function, a communication function of performing communication without encryption, or the like. For example, it is desirable to register the functions that can be replaced between the image forming apparatus 10A and the image forming apparatus 10B in advance as a list.

Further, as the level information indicating the level of the function, for example, with respect to the encrypted communication function, a higher score may be assigned in advance to an encryption algorithm with a higher security level. In the case of the printing function, a higher score may be assigned in advance as the printing speed becomes faster, but the printing speed itself may be used as the level information. Similarly, in the case of the communication function, a higher score may be assigned in advance as the communication speed becomes faster, or the communication speed itself may be used as the level information. In the image forming system 80 according to the present exemplary embodiment, the first level information is stored in advance in the memory 14, and the second level information is stored in advance in the memory 15 of the image forming apparatus 10B. The acquisition unit 32 acquires the first level information from the memory 14 and acquires the second level information from the image forming apparatus 10B through the network N.

In a case where the level indicated by the first level information acquired by the acquisition unit 32 is higher than the level indicated by the second level information, the replacement unit 34 replaces the function of the image forming apparatus 10B with the function of the image forming apparatus 10A. For example, in the case of the encrypted communication function, in a case where the score of the encryption algorithm of the image forming apparatus 10A is higher than the score of the encryption algorithm of the image forming apparatus 10B, the encrypted communication function of the image forming apparatus 10B is replaced with the further enhanced encrypted communication function of the image forming apparatus 10A. With this replacement, in a case of using the encrypted communication function of the image forming apparatus 10B, instead of using the function of the image forming apparatus 10B itself, the function of the image forming apparatus 10A is used. On the other hand, in a case where the level indicated by the first level information is equal to or less than the level indicated by the second level information, the replacement unit 34 does not replace the encrypted communication function of the image forming apparatus 10B.

In a case of determining whether the level of the same function in the image forming apparatus 10A and the image forming apparatus 10B is high or low, the replacement unit 34 (CPU 12A) may make a determination depending on whether the version of software, resource, and communication protocol relating to each function is old or new. That is, in this case, the function having a newer version is determined to have a higher level function.

Here, in a case where the function of the existing image forming apparatus 10B is replaced by the function of the new image forming apparatus 10A, the user may not be aware of replacement of the function and the operation efficiency may decrease. Therefore, the image forming apparatus 10A displays a message notifying that the function of the image forming apparatus 10B has been replaced with the function of the image forming apparatus 10A, based on the instruction from the replacement unit 34, by the display 16. For example, a message "The encrypted communication function is replaced with a new image forming apparatus". Furthermore, the image forming apparatus 10B may display a message similar to the above, based on an instruction from the replacement unit 34, by the display 17.

Figure 3:
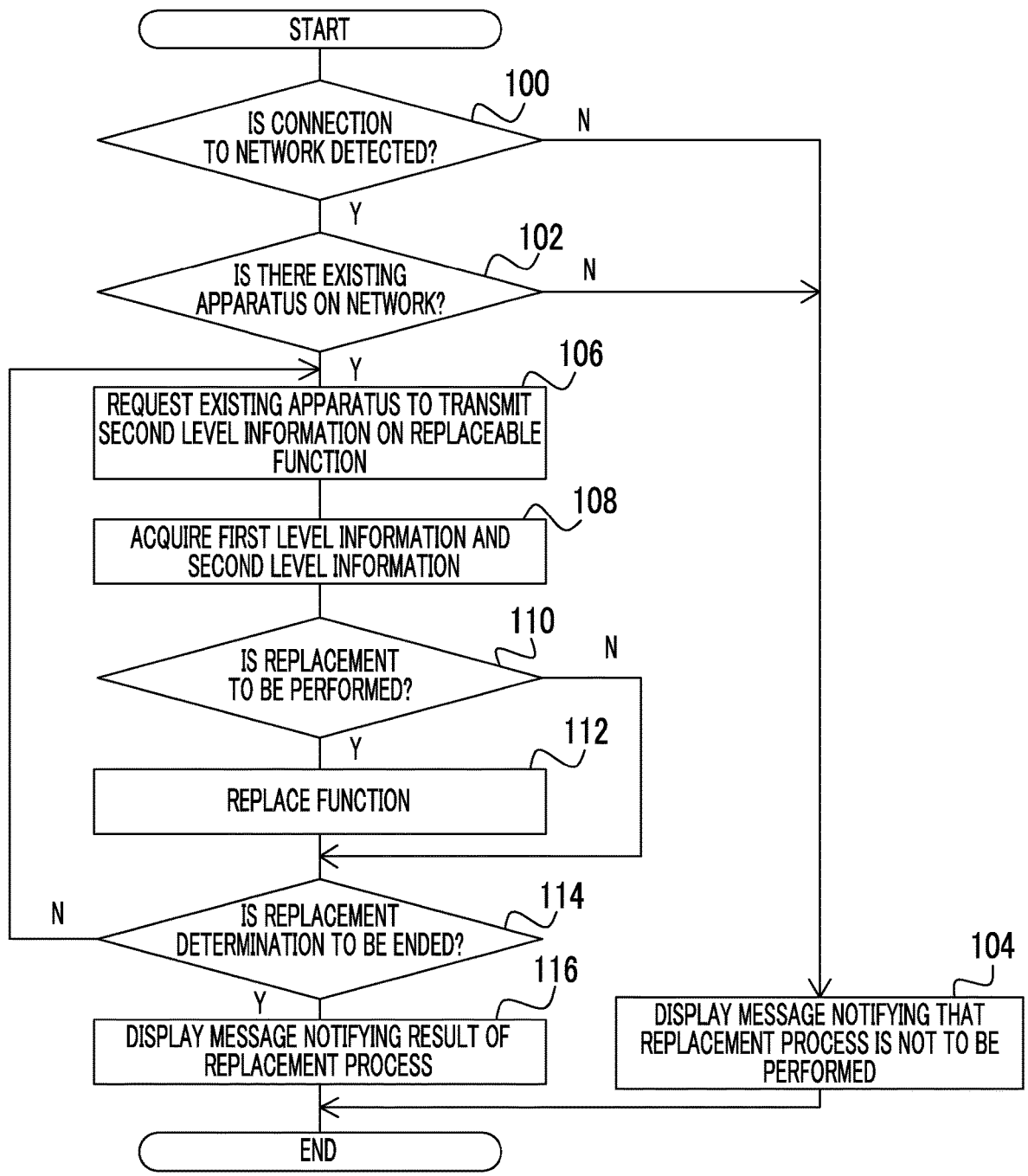
FIG. 3 is a flowchart illustrating an example of a flow of a process of a replacement processing program according to the first exemplary embodiment.

Next, the operation of the image forming apparatus 10A according to the first exemplary embodiment will be described with reference to FIG. 3. FIG. 3 is a flowchart illustrating an example of a flow of a process of the replacement processing program 14A according to the first exemplary embodiment.

First, in a case where the image forming apparatus 10A is newly established and the image forming apparatus 10A is turned on by a user's operation, the replacement processing program 14A is activated and the following steps are executed.

In step 100 of FIG. 3, the detection unit 30 detects whether there is connection to a network N or not. In a case where connection to the network N is detected (in the case of affirmative determination), the process proceeds to step 102, and in the case where connection to network N is not detected (in the case of negative determination), the process proceeds to step 104.

In step 102, the detection unit 30 detects whether or not there is an existing image forming apparatus 10B in the image forming system 80. In a case where an existing image forming apparatus 10B is detected (in the case of affirmative determination), the process proceeds to step 106, and in a case where an existing image forming apparatus 10B is not detected (in the case of negative determination), the process proceeds to step 104.

In step 104, the detection unit 30 causes the display 16 to display a message notifying that a replacement process is not to be performed, and ends the process of the replacement processing program. As a message in this case, for example, "Since connection to the network is not detected, a replacement process is not performed.", "Since existing apparatus is not detected, a replacement process is not performed.", or the like is displayed.

Meanwhile, in step 106, the acquisition unit 32 requests the image forming apparatus 10B through the network N for the second level information on a replaceable function registered in advance. As the replaceable function, as described above, there are cases where plural types of functions are registered.

In step 108, the acquisition unit 32 acquires the second level information on the function requested above from the image forming apparatus 10B. At this time, the acquisition unit 32 acquires the first level information on the function from the memory 14 of the image forming apparatus 10A.

In step 110, the replacement unit 34 determines whether to replace the function for which the first and second level information are acquired. That is, it is determined whether the level of the image forming apparatus 10A indicated by the first level information is higher than the level of the existing apparatus (image forming apparatus 10B) indicated by the second level information. In a case where it is determined that the level of the image forming apparatus 10A is higher than the level of the existing apparatus (in the case of affirmative determination), the process proceeds to step 112. On the other hand, in a case where it is determined that the level of the image forming apparatus 10A is equal to or lower than the level of the existing apparatus (in the case of negative determination), the process proceeds to step 114.

In step 112, the replacement unit 34 replaces the function of the existing apparatus with the function of the image forming apparatus 10A, and the process proceeds to step 114.

In step 114, the replacement unit 34 determines whether or not to end the replacement determination. That is, in a case where it is determined that the replacement determination has been completed for all replaceable functions registered in advance (in the case of affirmative determination), the process proceeds to step 116. On the other hand, in a case where it is determined that the replacement determination has not been completed for all replaceable functions (in the case of negative determination), the process returns to step 106 to repeat the process.

In step 116, the replacement unit 34 causes the display 16 to display a message notifying the result of the replacement process, and ends the series of processes of the replacement processing program. As a message in this case, for example, in a case where the replacement of the function A is executed, for example, "The function A is replaced with the new image forming apparatus." or the like is exemplified. On the other hand, in a case where replacement is not executed, for example, "Replacement of the function A was not executed. The function A remains in the existing image forming apparatus." or the like is exemplified.

Next, with reference to FIGS. 4 to 10, a more specific example of the case where the encrypted communication function is replaced between the new image forming apparatus 10A and the existing image forming apparatus 10B will be described.

Figure 4:
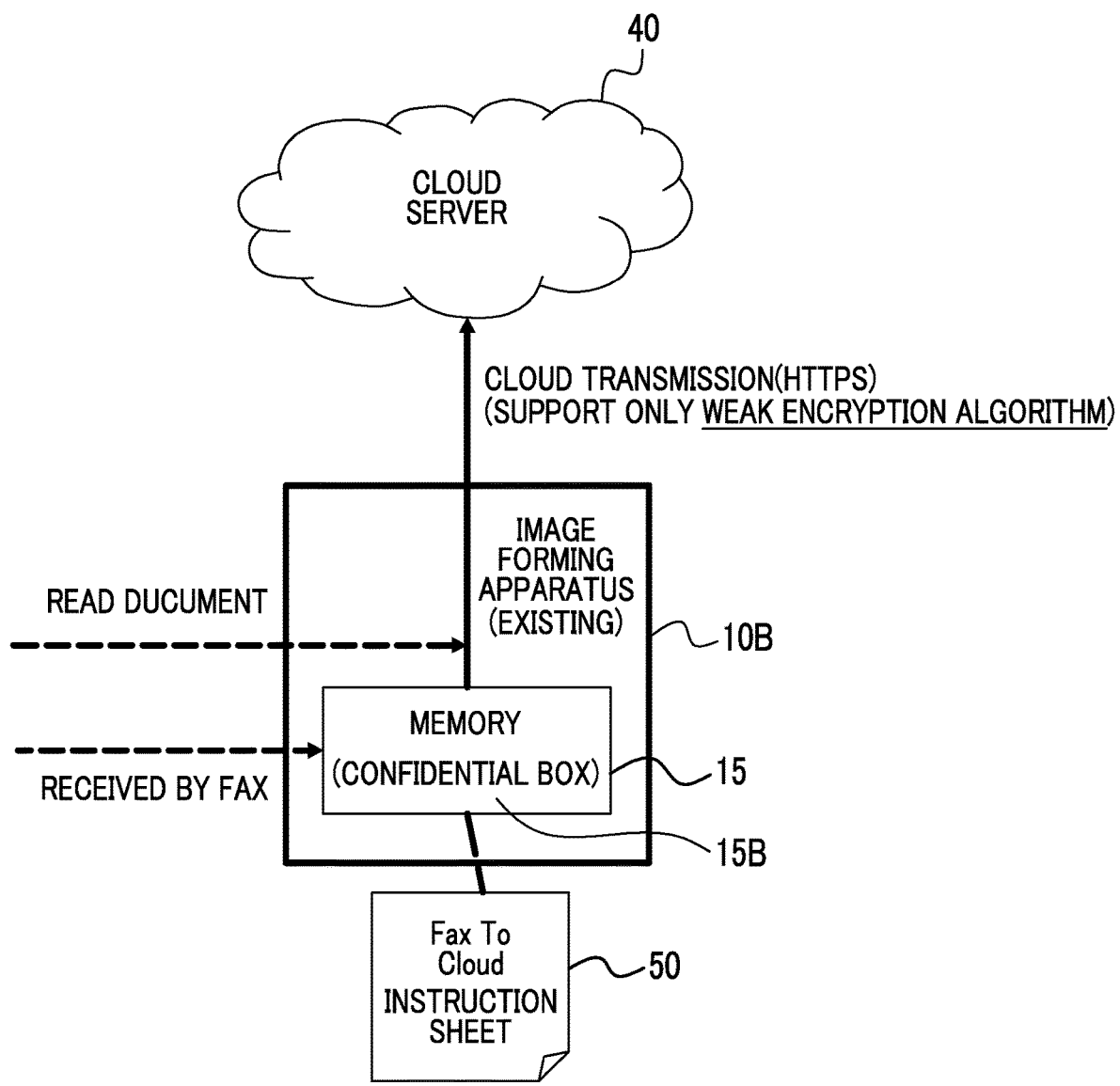
FIG. 4 is a schematic diagram showing an example of information flow in the existing image forming apparatus in the image forming system according to the first exemplary embodiment.

FIG. 4 is a schematic diagram showing an example of information flow in the existing image forming apparatus 10B in the image forming system 80 according to the first exemplary embodiment.

As shown in FIG. 4, the existing image forming apparatus 10B includes a memory 15, and the memory 15 is provided with a confidential box 15B.

The image forming apparatus 10B has a document reading function and has a so-called Scan To Cloud function that transfers a read document obtained by reading a document to a designated cloud server 40.

Further, the image forming apparatus 10B has a facsimile (hereinafter simply referred to as FAX) function, and has a so-called Fax To Cloud function of transferring the FAX document stored in the confidential box 15B by fax reception to the designated cloud server 40. Therefore, in the image forming apparatus 10B, an instruction sheet 50 describing a processing procedure for executing the Fax To Cloud function is registered. As for the above-described Scan To Cloud function, similar to the Fax To Cloud function, an instruction sheet for executing the Scan To Cloud function is registered in the image forming apparatus 10B, but the illustration thereof is omitted here.

FIG. 5 shows an example of the instruction sheet according to the present exemplary embodiment.

As shown in FIG. 5, as an example, the instruction sheet according to the present exemplary embodiment is described using Extensible Markup Language (XML), but the applicable language is not limited to XML.

Note that the same applies to other instruction sheets, and it is assumed that processing procedures are described according to predetermined functions. In each image forming apparatus, by registering an instruction sheet corresponding to each function, each function is executed according to the processing procedure of the instruction sheet.

For example, in a case where execution of the Fax To Cloud function is instructed, the image forming apparatus 10B in which the instruction sheet 50 is registered transfers the Fax document received by FAX and stored in the confidential box 15B to the designated cloud server 40, in accordance with the processing procedure described in the instruction sheet 50.

Here, the read document and the FAX document are encrypted and transferred to the cloud server 40, for example, using Hypertext Transfer Protocol Secure (HTTPS). In the image forming apparatus 10B, some encryption algorithms may be supported to encrypt read documents and FAX documents. However, any encryption algorithm has a relatively low security level. In other words, the image forming apparatus 10B supports only relatively weak encryption algorithm.

Figure 6:
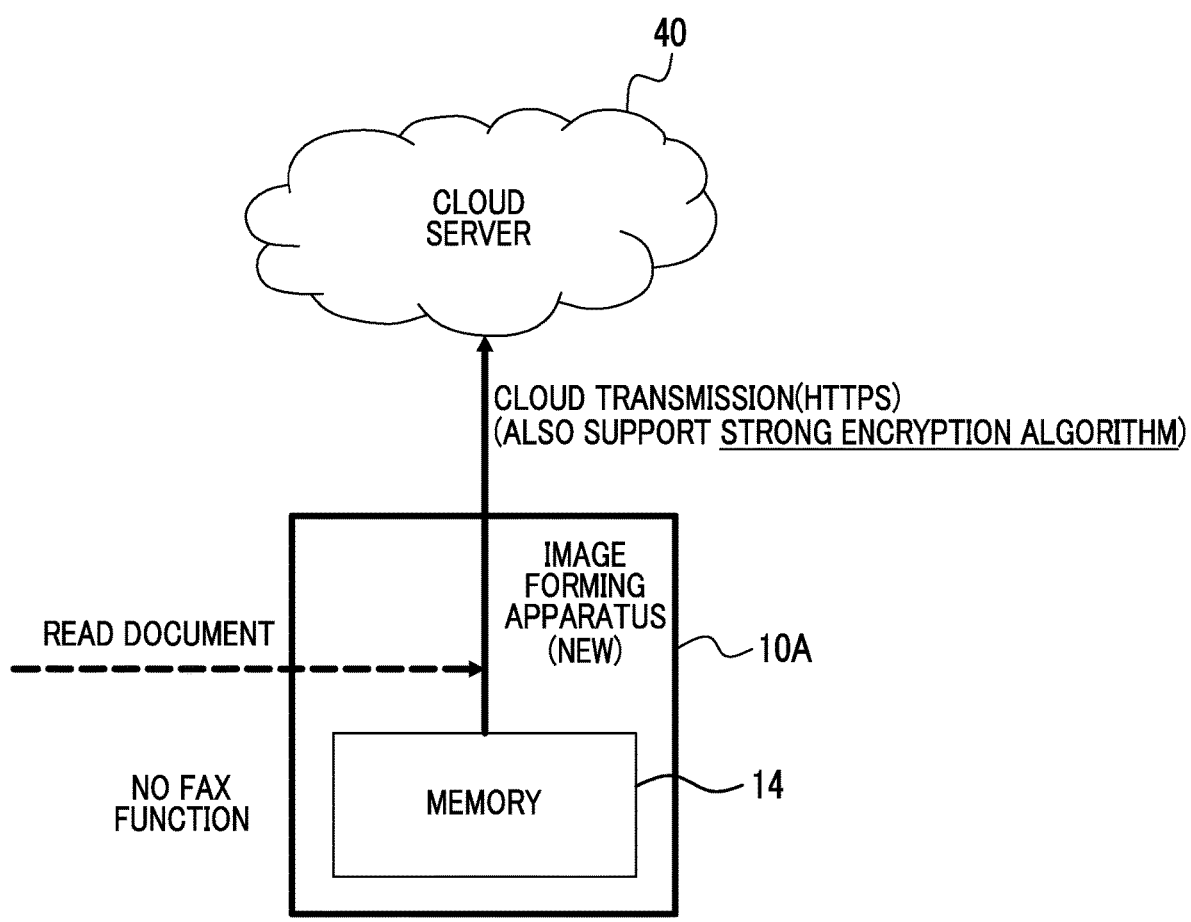
FIG. 6 is a schematic diagram showing an example of a flow of information in a new image forming apparatus in the image forming system according to the first exemplary embodiment.

FIG. 6 is a schematic diagram showing an example of information flow in the new image forming apparatus 10A in the image forming system 80 according to the first exemplary embodiment.

As shown in FIG. 6, there is no confidential box in the memory 14 of the new image forming apparatus 10A. In the image forming apparatus 10A, the Scan To Cloud function is provided, but the FAX function is not provided.

In the image forming apparatus 10A, as in the image forming apparatus 10B, the read document is encrypted using HTTPS and transferred to the cloud server 40. However, the image forming apparatus 10A supports an encryption algorithm having a relatively higher security level than the encryption algorithm supported by the image forming apparatus 10B. In other words, the image forming apparatus 10A supports a relatively strong encryption algorithm.

Under the above situation, in the existing image forming apparatus 10B, it is desired to continue to use the FAX function. On the other hand, for example, from the viewpoint of security, it is desirable to transfer to the cloud server 40 from the new image forming apparatus 10A, since a stronger encryption algorithm can be used. Therefore, as will be described below, a process of replacing the encrypted communication function between the new image forming apparatus 10A and the existing image forming apparatus 10B is performed.

Figure 7:
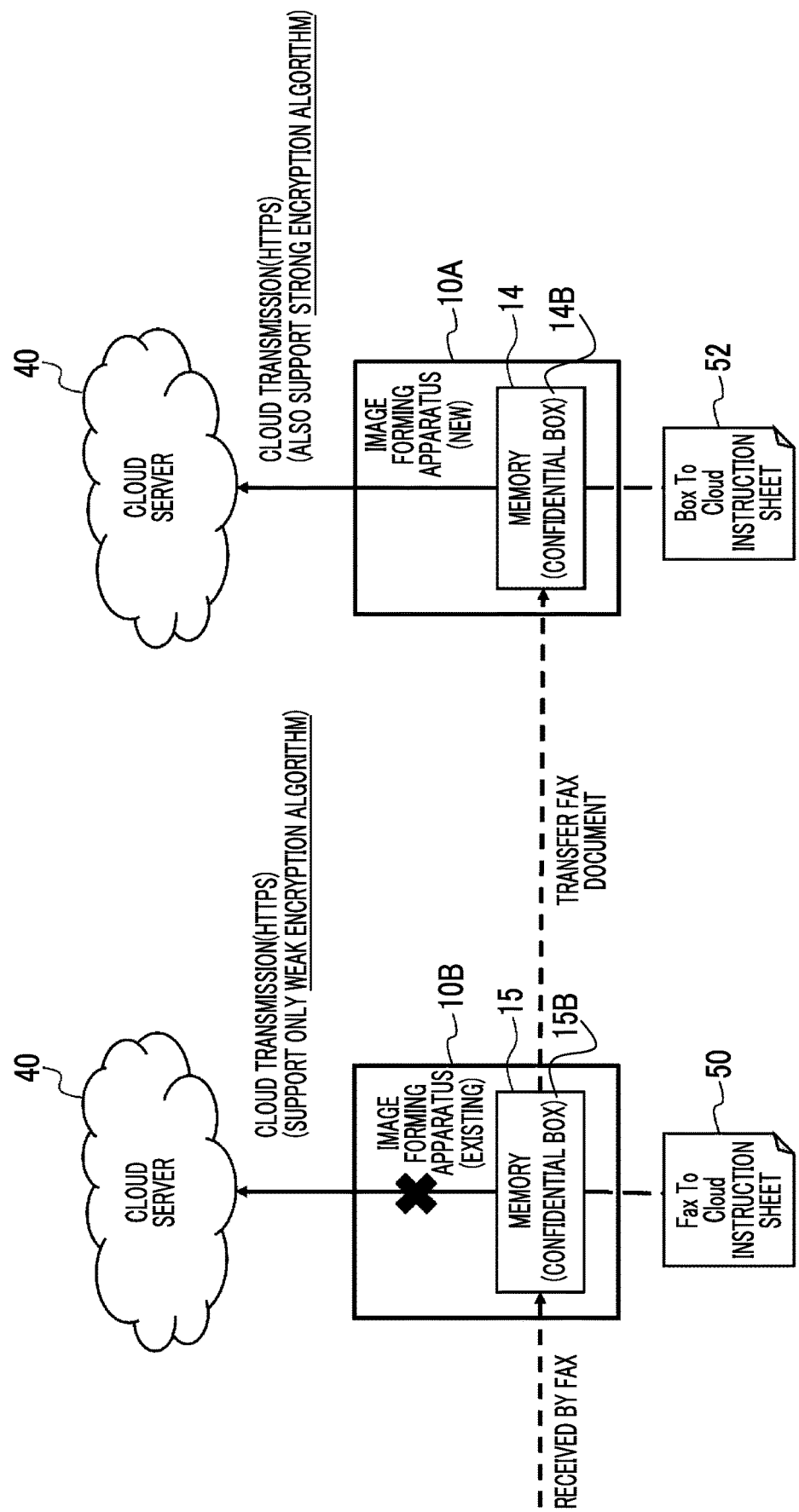
FIG. 7 is a schematic diagram showing the outline of a process of replacing the encrypted communication function between the new image forming apparatus and the existing image forming apparatus according to the first exemplary embodiment.

FIG. 7 is a schematic diagram showing the outline of a process of replacing the encrypted communication function between the new image forming apparatus 10A and the existing image forming apparatus 10B according to the first exemplary embodiment.

As shown in FIG. 7, the existing image forming apparatus 10B updates the instruction sheet 50 for executing the Fax To Cloud function. Specifically, "transfer Fax document received by FAX and stored in the confidential box 15B to the designated cloud server 40" is updated to "transfer Fax document received by FAX and stored in the confidential box 15B to the confidential box 14B of the image forming apparatus 10A".

The new image forming apparatus 10A generates a new confidential box 14B in the memory 14, and generates and allocates a new instruction sheet 52 for executing the Box To Cloud function. The instruction sheet 52 is an instruction sheet with the content "transfer the FAX document transferred to the confidential box 14B to the designated cloud server 40".

Figure 8:
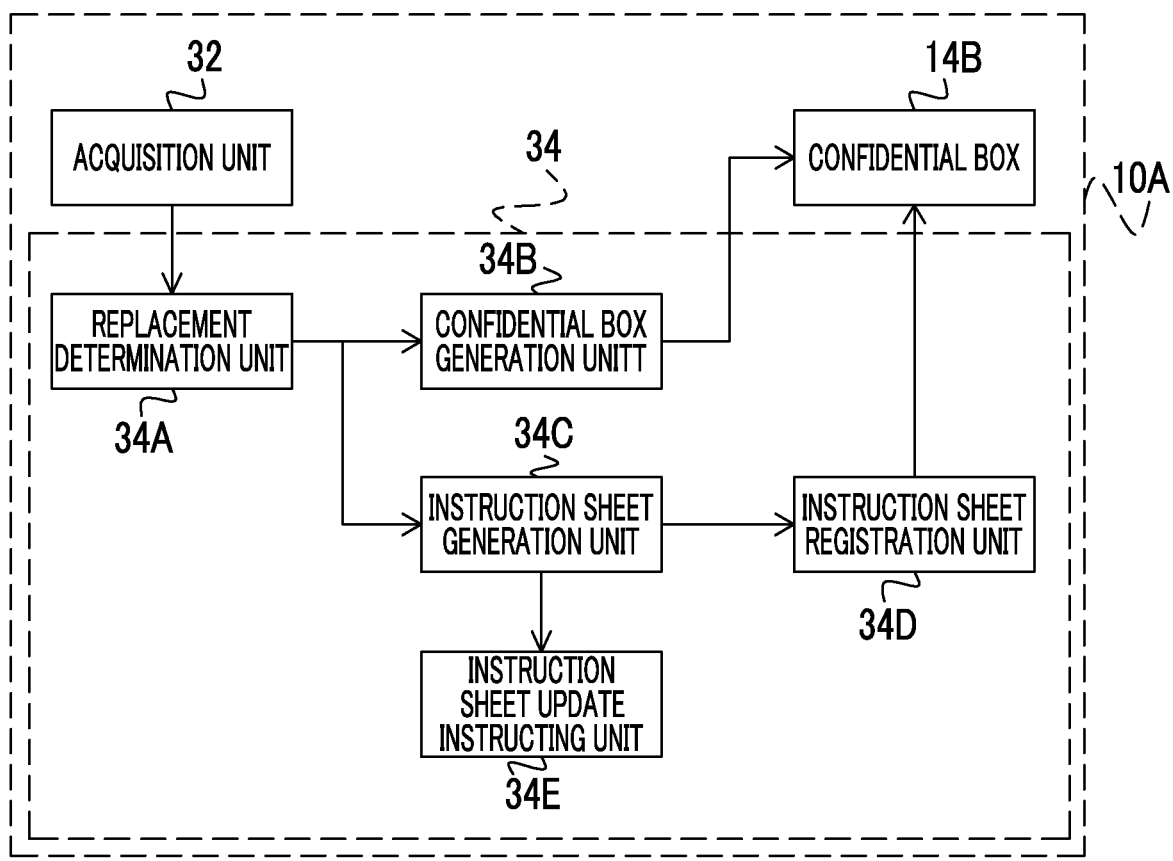
FIG. 8 is a block diagram showing an example of the configuration of a new image forming apparatus in the case of autonomously performing a replacement process of an encrypted communication function, according to the first exemplary embodiment.

FIG. 8 is a block diagram showing an example of the configuration of a new image forming apparatus 10A in the case of autonomously performing a replacement process of an encrypted communication function, according to the first exemplary embodiment.

As shown in FIG. 8, the image forming apparatus 10A according to the present exemplary embodiment includes an acquisition unit 32, a replacement determination unit 34A, a confidential box generation unit 34B, an instruction sheet generation unit 34C, an instruction sheet registration unit 34D, and an instruction sheet update instructing unit 34E. The replacement determination unit 34A, the confidential box generation unit 34B, the instruction sheet generation unit 34C, the instruction sheet registration unit 34D, and the instruction sheet update instructing unit 34E are components of the above-described replacement unit 34. The illustration of the detection unit 30 is omitted here.

Figure 9:
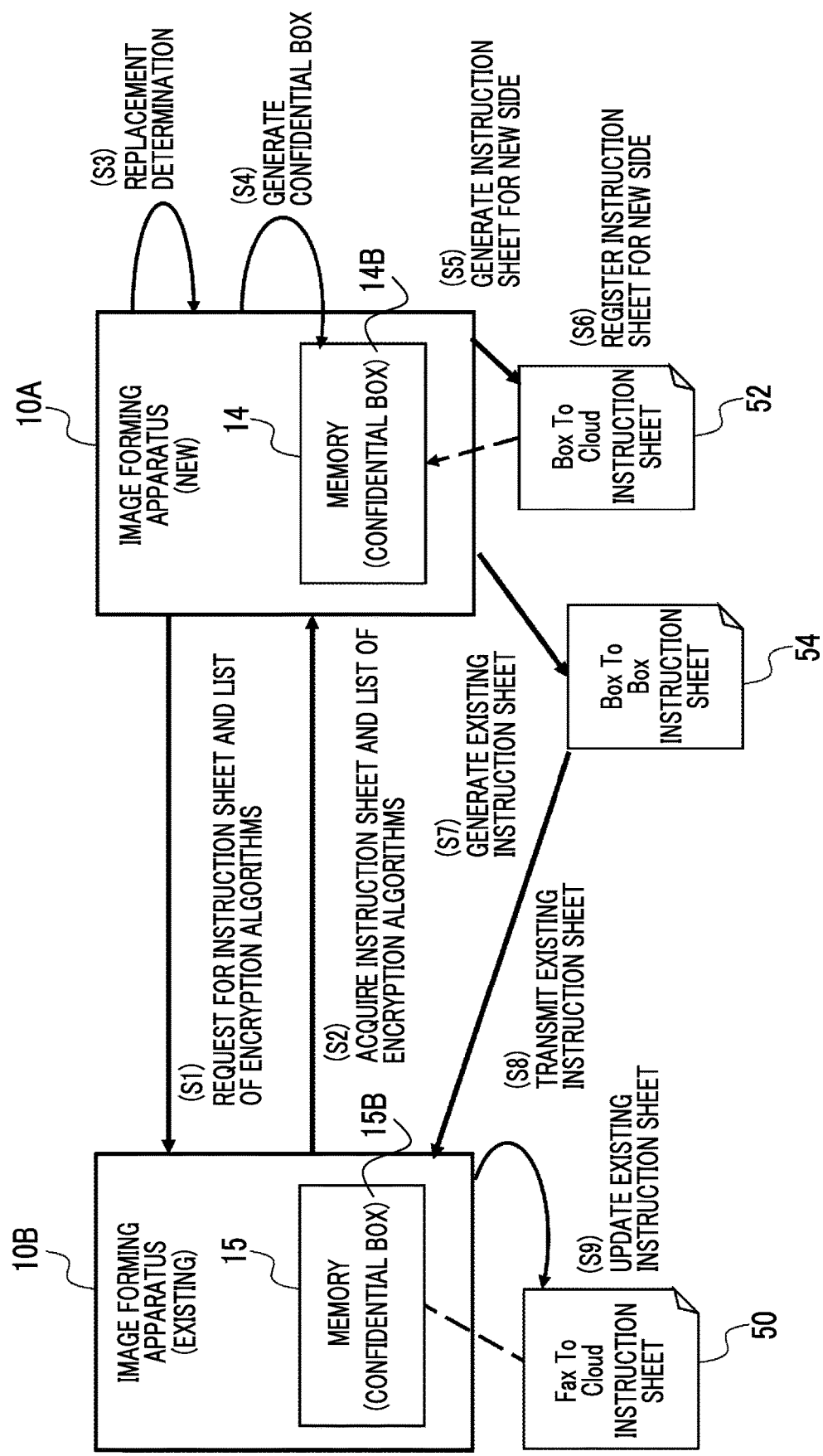
FIG. 9 is a diagram illustrating an example of the procedure of the replacement process of an encrypted communication function that the new image forming apparatus according to the first exemplary embodiment performs autonomously.

Next, with reference to FIG. 9, a replacement process of an encrypted communication function that the new image forming apparatus 10A according to the first exemplary embodiment performs autonomously will be described. FIG. 9 is a diagram illustrating an example of the procedure of the replacement process of an encrypted communication function that the new image forming apparatus 10A according to the first exemplary embodiment performs autonomously.

First, in (S1) of FIG. 9, the acquisition unit 32 requests the existing image forming apparatus 10B to transmit the instruction sheet 50 for executing the Fax To Cloud function and the list of supported encryption algorithms through the network N. In response to an acquisition request from the acquisition unit 32, the image forming apparatus 10B transmits an instruction sheet 50 and a list of supported encryption algorithms to the image forming apparatus 10A. Incidentally, the instruction sheet 50 includes the address information of the cloud server 40 and is used at the time of generating the instruction sheet 52 for executing the Box To Cloud function of the new side. The instruction sheet 50 also includes information such as the authentication information of the cloud server 40, the storage destination of the transfer document, the document name at the time of storage, and the like, and these types of information are used as necessary at the time of generating the instruction sheet 52.

In (S2), the acquisition unit 32 acquires the instruction sheet 50 and the list of supported encryption algorithms, transmitted from the image forming apparatus 10B. At this time, the acquisition unit 32 also acquires from the memory 14 the list of encryption algorithms supported by the image forming apparatus 10A. With respect to each encryption algorithm list of the image forming apparatus 10A and the image forming apparatus 10B, scores are given in advance as level information to individual encryption algorithms.

In (S3), the replacement determination unit 34A determines whether or not to replace the encrypted communication function of the image forming apparatus 10B with the encrypted communication function of the image forming apparatus 10A. First, the replacement determination unit 34A generates a comparison table shown in FIG. 10 from the encryption algorithm list obtained from each of the image forming apparatus 10A and the image forming apparatus 10B.

FIG. 10 is a schematic diagram showing an example of a comparison table according to the present exemplary embodiment.

In the comparison table shown in FIG. 10, a new apparatus shows the image forming apparatus 10A, and an existing apparatus shows the image forming apparatus 10B. In this example, with respect to the five types of encryption algorithms, the higher the score, the higher the security level, which means strong encryption algorithm.

In the comparison table according to the present exemplary embodiment, the encryption algorithms of the existing image forming apparatus 10B are the upper thee algorithms, that is, "RSA_WITH_RC4_SHA", "RSA_WITH_DES_CBC_SHA", and "RSA_WITH_3DES_EDE_CBC_SHA" from the top. "RC4" is a registered trademark. On the other hand, the encryption algorithms of the new image forming apparatus 10A are the lower three algorithms, that is, "RSA_WITH_AES_256_CBC_SHA", "RSA_WITH_AES_128_CBC_SHA", and "RSA_WITH_3DES_EDE_CBC_SHA", from the bottom. Although plural encryption algorithms are supported by one image forming apparatus, which encryption algorithms to be used is determined by negotiation with the cloud server 40 of the communication partner.

The following criteria (a) to (d) are applied to determination as to whether to replace the encrypted communication function.

(a) Replacement is performed in a case where the total score of plural encryption algorithms of the image forming apparatus 10A is higher than the total score of the plural encryption algorithms of the image forming apparatus 10B.

(b) Replacement is performed in a case where the average score of plural encryption algorithms of the image forming apparatus 10A is higher than the average score of the plural encryption algorithms of the image forming apparatus 10B.

(c) Replacement is performed in a case where the highest score of plural encryption algorithms of the image forming apparatus 10A is higher than the highest score of the plural encryption algorithms of the image forming apparatus 10B.

(d) Replacement is performed in a case where the lowest score of plural encryption algorithms of the image forming apparatus 10A is higher than the lowest score of the plural encryption algorithms of the image forming apparatus 10B.

In a case where it is determined that replacement of the encrypted communication function is to be performed using the comparison table, the replacement determination unit 34A instructs the confidential box generation unit 34B to generate the confidential box 14B and instructs the instruction sheet generation unit 34C to generate a necessary instruction sheet. On the other hand, in a case where it is determined that replacement of the encrypted communication function is not to be performed using the comparison table, the replacement determination unit 34A causes the display 16 to display a message notifying that replacement of the encrypted communication function is not to be performed and ends the process.

In (S4), the confidential box generation unit 34B generates a new confidential box 14B in the memory 14 in accordance with the instruction from the replacement determination unit 34A.

In (S5), in accordance with the instruction from the replacement determination unit 34A, the instruction sheet generation unit 34C generates an instruction sheet 52 for executing the Box To Cloud function, as an instruction sheet for a new side, with reference to the information such as the address information of the cloud server 40, the authentication information, the storage destination of the transfer document, the document name at the time of storage, and the like included in the instruction sheet 50.

In (S6), the instruction sheet registration unit 34D registers the instruction sheet 52 generated above in the image forming apparatus 10A. By this registration process, the function of transferring the FAX document received in the confidential box 14B to the cloud server 40 is realized.

In (S7), the instruction sheet generation unit 34C generates an instruction sheet 54 for executing the Box To Box function, as an instruction sheet for an existing side, in accordance with an instruction from the replacement determination unit 34A. The Box To Box function is a function of transferring the Fax document received by FAX and stored in the confidential box 15B to confidential box 14B of the image forming apparatus 10A.

In (S8), the instruction sheet update instructing unit 34E transmits the instruction sheet 54 generated above to the image forming apparatus 10B, and also instructs the image forming apparatus 10B to update the instruction sheet 50 with the instruction sheet 54.

In (S9), the image forming apparatus 10B updates the instruction sheet 50 with the instruction sheet 54 according to the update instruction from the instruction sheet update instructing unit 34E. By this updating process, a function of transferring the Fax document received by FAX and stored in the confidential box 15B to confidential box 14B of the image forming apparatus 10A is realized.

Figure 11:
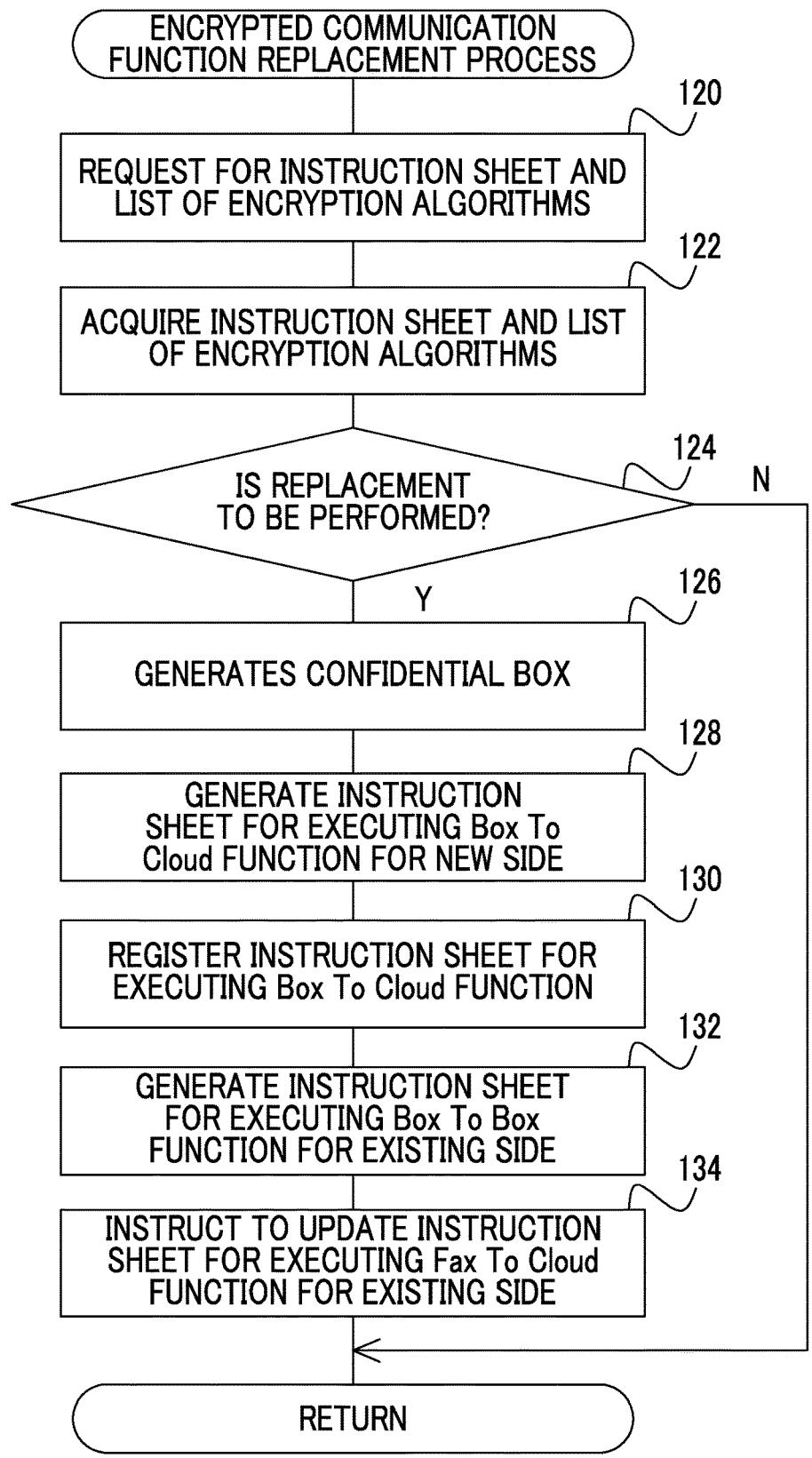
FIG. 11 is a flowchart illustrating an example of a flow of a replacement process of the encrypted communication function by the replacement processing program according to the first exemplary embodiment.

Next, with reference to FIG. 11, the operation of the image forming apparatus 10A which performs the replacement process of the encrypted communication function according to the first exemplary embodiment will be described. FIG. 11 is a flowchart illustrating an example of a flow of a replacement process of the encrypted communication function by the replacement processing program 14A according to the first exemplary embodiment.

Steps 120 to 134 shown in FIG. 11 specifically show the case where the replacement process of the encrypted communication function is applied to the process of steps 106 to 112 shown in FIG. 3 described above.

First, in step 120 of FIG. 11, the acquisition unit 32 requests the existing image forming apparatus 10B to transmit the instruction sheet 50 and the list of supported encryption algorithms through the network N.

In step 122, the acquisition unit 32 acquires the instruction sheet 50 and the list of supported encryption algorithms, transmitted from the image forming apparatus 10B. At this time, the acquisition unit 32 also acquires the list of encryption algorithms supported by the image forming apparatus 10A, from the memory 14 of the image forming apparatus 10A.

In step 124, as described above, based on the comparison table shown in FIG. 10, the replacement determination unit 34A determines whether to replace the encrypted communication function of the image forming apparatus 10B with the encrypted communication function of the image forming apparatus 10A. In a case where it is determined that replacement is to be performed (in the case of affirmative determination), the process proceeds to step 126, and in a case where it is determined that replacement is not to be performed (in the case of negative determination), the process proceeds to step 114 in FIG. 3.

In step 126, the confidential box generation unit 34B generates a confidential box 14B in the memory 14.

In step 128, the instruction sheet generation unit 34C generates an instruction sheet 52 for executing the Box To Cloud function, as an instruction sheet for a new side, with reference to the information such as the address information of the cloud server 40, the authentication information, the storage destination of the transfer document, the document name at the time of storage, and the like included in the instruction sheet 50.

In step 130, the instruction sheet registration unit 34D registers the instruction sheet 52 generated above in the image forming apparatus 10A. By this registration process, the function of transferring the FAX document received in the confidential box 14B to the cloud server 40 is realized.

In step 132, the instruction sheet generation unit 34C generates an instruction sheet 54 for executing the Box To Box function, as the instruction sheet for an existing side.

In step 134, the instruction sheet update instructing unit 34E transmits the instruction sheet 54 generated above to the image forming apparatus 10B, and also instructs the image forming apparatus 10B to update the instruction sheet 50 with the instruction sheet 54. In this case, the image forming apparatus 10B updates the instruction sheet 50 with the instruction sheet 54 according to the update instruction from the instruction sheet update instructing unit 34E.

As described above, the function replacement process according to the present exemplary embodiment is realized by each of the new image forming apparatus 10A and the existing image forming apparatus 10B updating or newly generating the "instruction sheet" corresponding to each function.

In the above description, the case where the encrypted communication function is replaced between the new image forming apparatus 10A and the existing image forming apparatus 10B has been described by way of example. The present exemplary embodiment is not limited to the encrypted communication function, and other replaceable functions such as a printing function and a communication function can be replaced by updating and newly generating "instruction sheet".

As described above, according to the present exemplary embodiment, in a case where the level of the function of one image forming apparatus 10A is higher than the level of the same function of the other image forming apparatus 10B, the function of the image forming apparatus 10A is utilized more effectively by replacing the function.

Second Exemplary Embodiment

In the above-described first exemplary embodiment, the new image forming apparatus 10A performs a function replacement process autonomously, but in the present exemplary embodiment, the case where the existing image forming apparatus 10B performs a function replacement process autonomously will be described.

Figure 12:
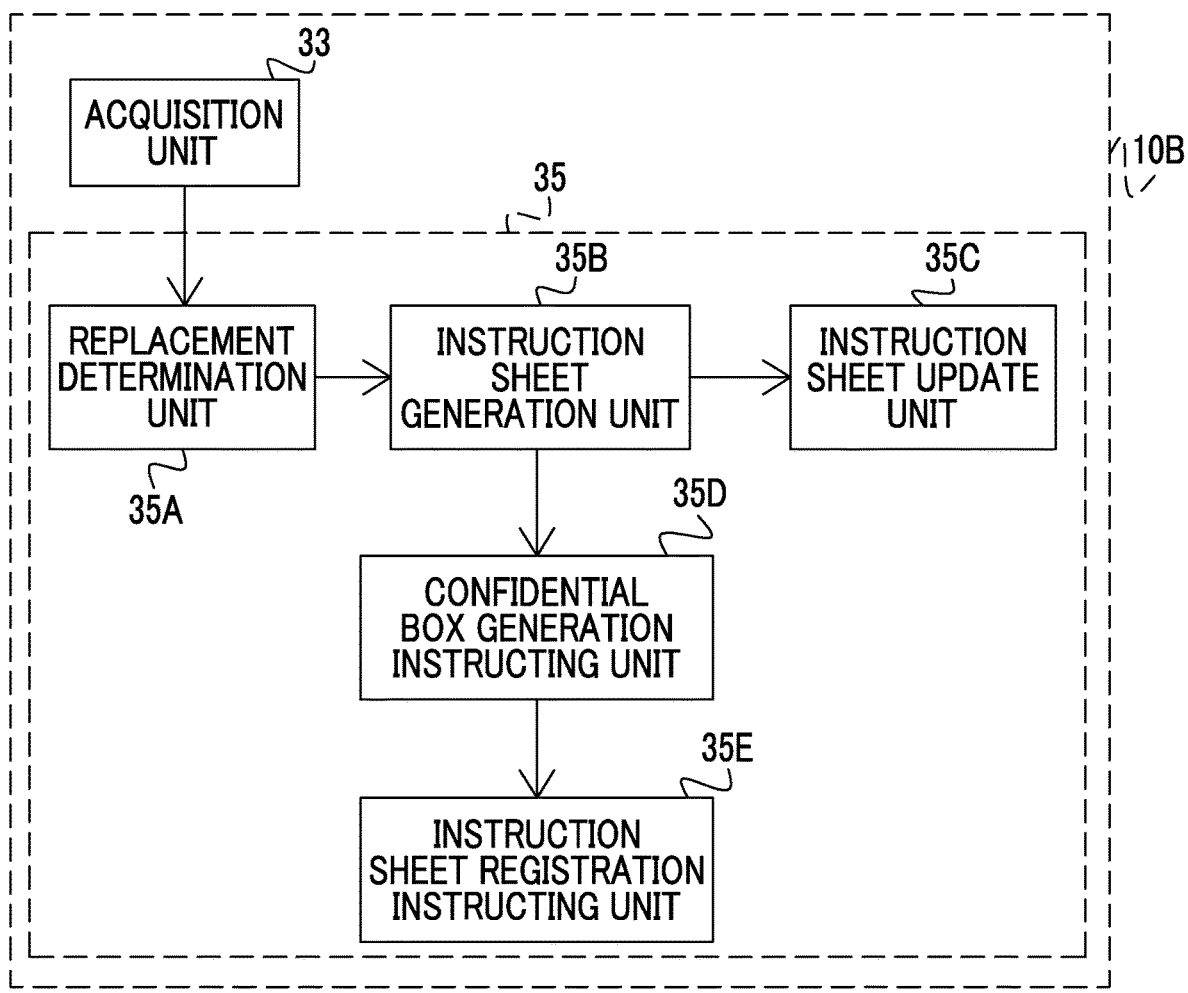
FIG. 12 is a block diagram showing an example of the configuration of an existing image forming apparatus in the case of autonomously performing a replacement process of an encrypted communication function, according to the second exemplary embodiment.

FIG. 12 is a block diagram showing an example of the configuration of an existing image forming apparatus 10B in the case of autonomously performing a replacement process of an encrypted communication function, according to the second exemplary embodiment.

As shown in FIG. 12, the image forming apparatus 10B according to the present exemplary embodiment includes an acquisition unit 33 and a replacement unit 35. The replacement unit 35 includes a replacement determination unit 35A, an instruction sheet generation unit 35B, an instruction sheet update unit 35C, a confidential box generation instructing unit 35D, and an instruction sheet registration instructing unit 35E. The illustration of the detection unit is omitted here. The detection unit detects the newly established image forming apparatus 10A.

Figure 13:
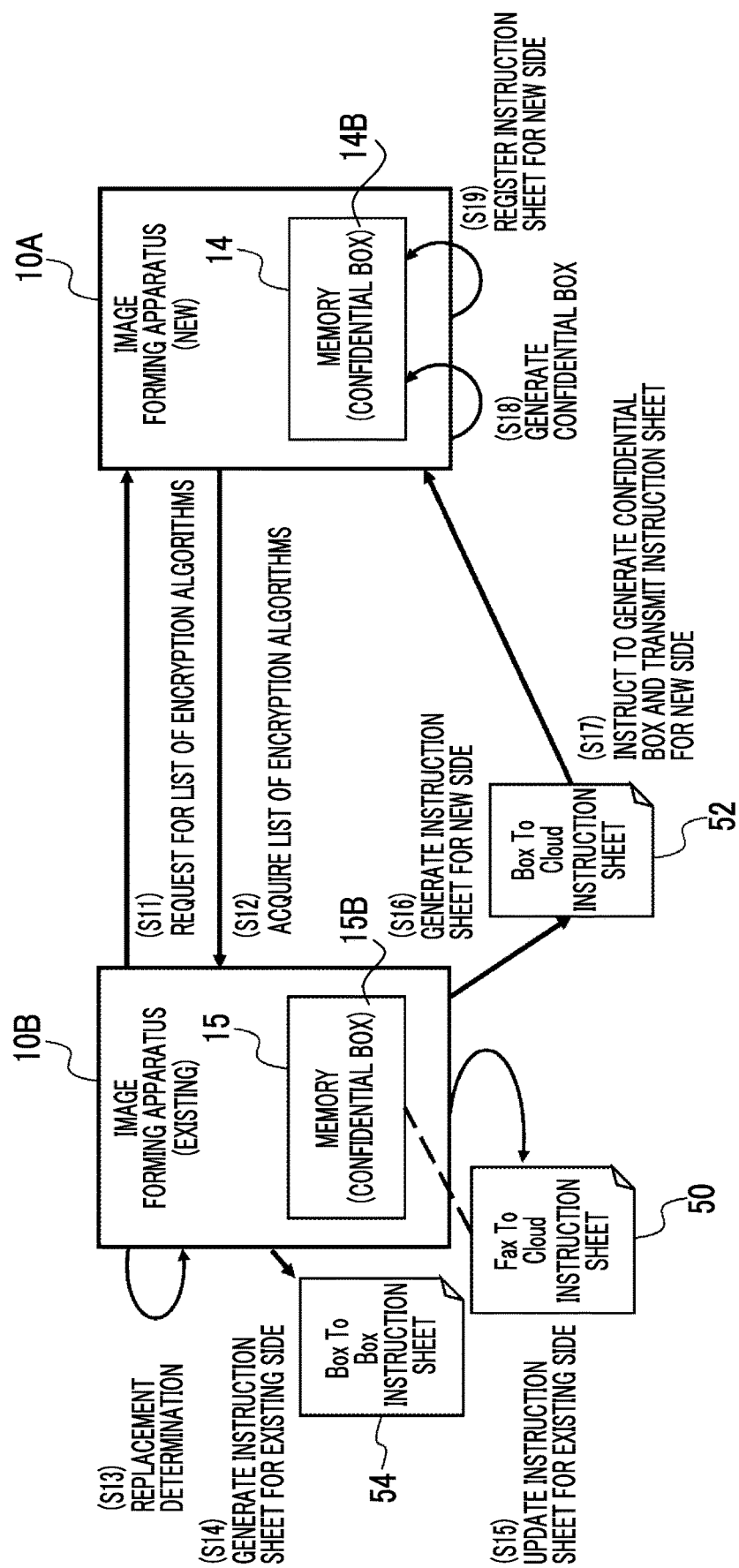
FIG. 13 is a diagram illustrating an example of the procedure of the replacement process of an encrypted communication function that the existing image forming apparatus according to the second exemplary embodiment performs autonomously.

Next, with reference to FIG. 13, a replacement process of an encrypted communication function that the existing image forming apparatus 10B according to the second exemplary embodiment performs autonomously will be described. FIG. 13 shows an example of the procedure of the replacement process of an encrypted communication function that the existing image forming apparatus 10B according to the second exemplary embodiment performs autonomously.

First, in (S11) of FIG. 13, the acquisition unit 33 requests the new image forming apparatus 10A to transmit the list of supported encryption algorithms, through the network N. In response to an acquisition request from the acquisition unit 33, the image forming apparatus 10A transmits a list of supported encryption algorithms to the image forming apparatus 10B.

In (S12), the acquisition unit 33 acquires the list of supported encryption algorithms, transmitted from the image forming apparatus 10A. At this time, the acquisition unit 33 also acquires from the memory 15 the list of encryption algorithms supported by the image forming apparatus 10B. With respect to each encryption algorithm list of the image forming apparatus 10A and the image forming apparatus 10B, scores are given in advance as level information to individual encryption algorithms.

In (S13), the replacement determination unit 35A determines whether or not to replace the encrypted communication function of the image forming apparatus 10B with the encrypted communication function of the image forming apparatus 10A. Specifically, the replacement determination unit 35A generates a comparison table shown in FIG. 10 described above from the encryption algorithm list acquired from each of the image forming apparatus 10A and the image forming apparatus 10B and makes a determination by using the generated comparison table.

In a case where it is determined that replacement of the encrypted communication function is to be performed using the comparison table, the replacement determination unit 35A instructs the instruction sheet generation unit 35B to generate a necessary instruction sheet. On the other hand, in a case where it is determined that replacement of the encrypted communication function is not to be performed using the comparison table, the replacement determination unit 35A causes the display 16 to display a message notifying that replacement of the encrypted communication function is not to be performed and ends the process.

In (S14), the instruction sheet generation unit 35B generates an instruction sheet 54 for executing the Box To Box function, as an instruction sheet for an existing side, in accordance with an instruction from the replacement determination unit 35A.

In (S15), the instruction sheet update unit 35C updates the instruction sheet 50 for executing the Fax To Cloud function, based on the above-generated instruction sheet 54. The instruction sheet 50 is an instruction sheet registered in the image forming apparatus 10B in advance. By this updating process, a function of transferring the Fax document received by FAX and stored in the confidential box 15B to confidential box 14B of the image forming apparatus 10A is realized.

In (S16), in accordance with the instruction from the replacement determination unit 35A, the instruction sheet generation unit 35B generates an instruction sheet 52 for executing the Box To Cloud function, as an instruction sheet for a new side, with reference to the information such as the address information of the cloud server 40, the authentication information, the storage destination of the transfer document, the document name at the time of storage, and the like included in the instruction sheet 50.

In (S17), the confidential box generation instructing unit 35D instructs the image forming apparatus 10A to generate a confidential box 14B. Further, the instruction sheet registration instructing unit 35E transmits the instruction sheet 52 generated above to the image forming apparatus 10A, and instructs it to register the instruction sheet 52.

In (S18), the image forming apparatus 10A generates a new confidential box 14B in the memory 14 in accordance with an instruction from the confidential box generation instructing unit 35D.

In (S19), the image forming apparatus 10A registers the instruction sheet 52 received from the image forming apparatus 10B in the image forming apparatus 10A in accordance with the instruction from the instruction sheet registration instructing unit 35E. By this registration process, the function of transferring the FAX document received in the confidential box 14B to the cloud server 40 is realized.

Third Exemplary Embodiment

In the above-described first exemplary embodiment, the new image forming apparatus 10A performs a function replacement process autonomously, but in the second exemplary embodiment, the case where the existing image forming apparatus 10B performs a function replacement process autonomously is described. In the present exemplary embodiment, a case where an external server apparatus 60 performs a function replacement process autonomously will be described.

Figure 14:
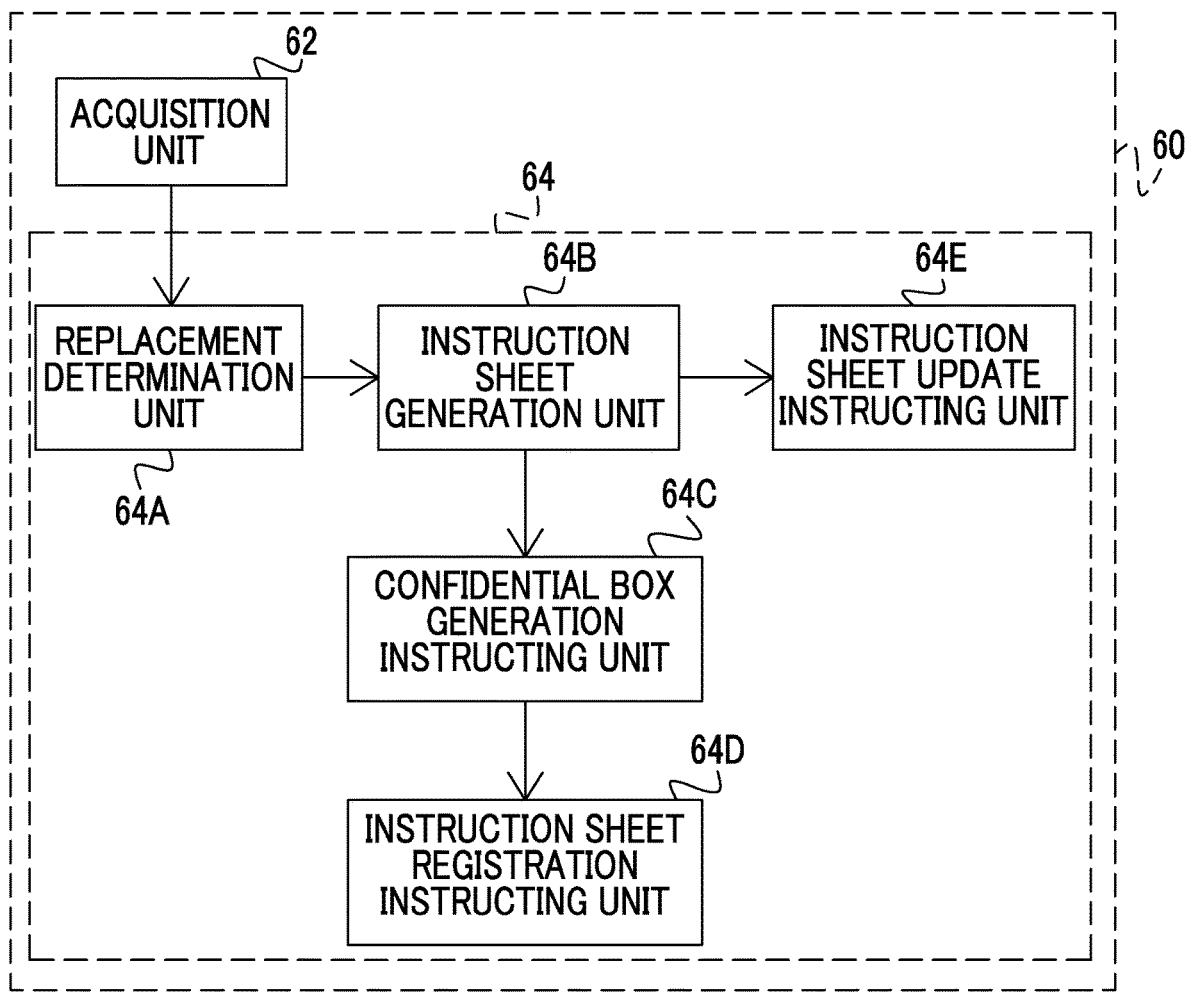
FIG. 14 is a block diagram showing an example of the configuration of a server apparatus in the case of autonomously performing a replacement process of an encrypted communication function, according to the third exemplary embodiment.

FIG. 14 is a block diagram showing an example of the configuration of a server apparatus 60 in the case of autonomously performing a replacement process of an encrypted communication function, according to the third exemplary embodiment.

As shown in FIG. 14, the server apparatus 60 according to the present exemplary embodiment includes an acquisition unit 62 and a replacement unit 64. The replacement unit 64 includes a replacement determination unit 64A, an instruction sheet generation unit 64B, a confidential box generation instructing unit 64C, an instruction sheet registration instructing unit 64D, and an instruction sheet update instructing unit 64E. The illustration of the detection unit is omitted here. The detection unit detects the newly established image forming apparatus 10A.

Figure 15:
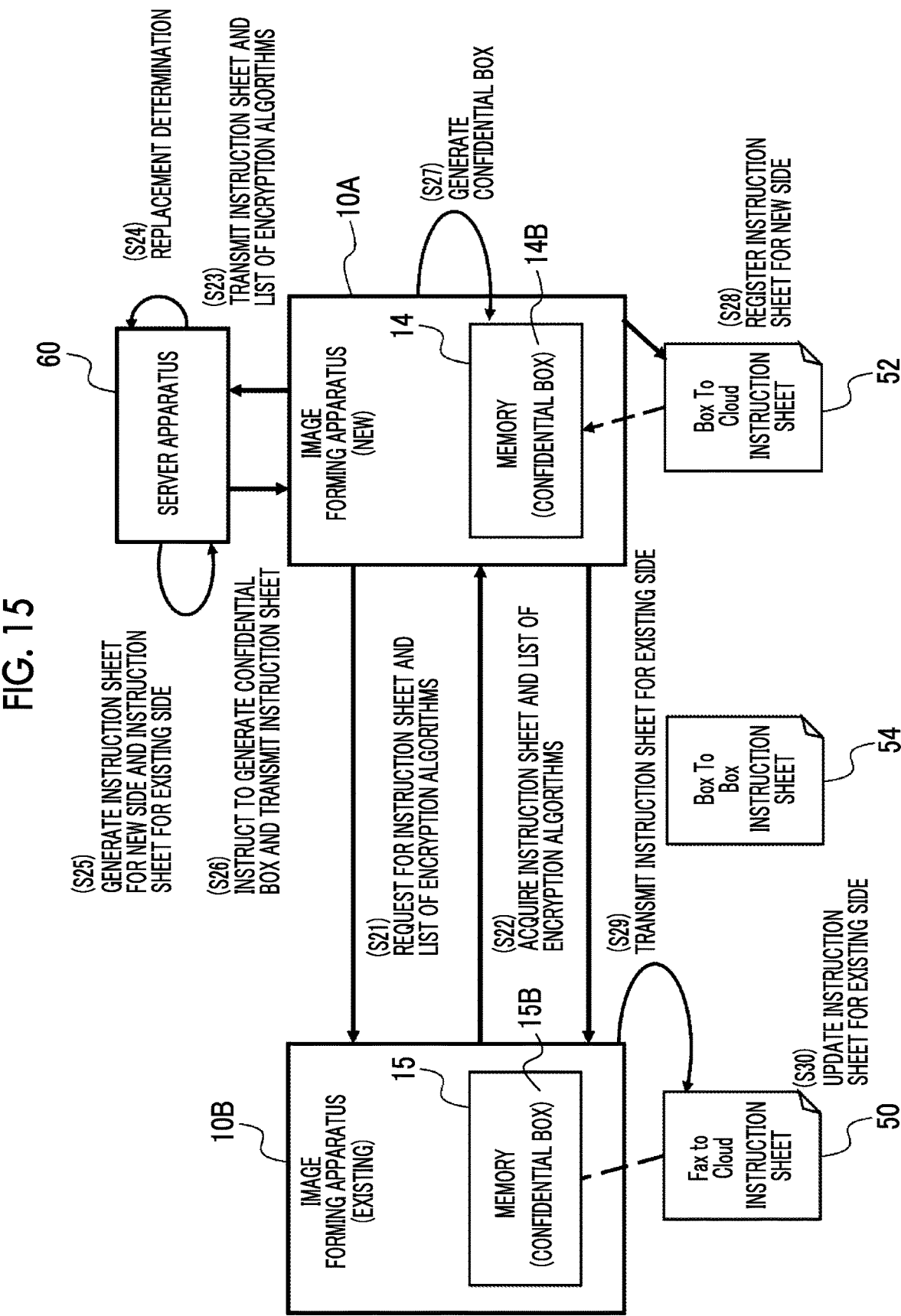
FIG. 15 is a diagram illustrating an example of the procedure of the replacement process of an encrypted communication function that the server apparatus according to the third exemplary embodiment performs autonomously.

Next, with reference to FIG. 15, a replacement process of an encrypted communication function that the server apparatus 60 according to the third exemplary embodiment performs autonomously will be described. FIG. 15 is a diagram illustrating an example of the procedure of the replacement process of an encrypted communication function that the server apparatus 60 according to the third exemplary embodiment performs autonomously.

In the present exemplary embodiment, an external server apparatus 60 and a new image forming apparatus 10A are communicably connected to each other, and the replacement process of the encryption function is realized by cooperation between them.

First, in (S21) of FIG. 15, the image forming apparatus 10A requests the existing image forming apparatus 10B to transmit the instruction sheet 50 for executing the Fax To Cloud function and the list of supported encryption algorithms through the network N. In response to an acquisition request from the image forming apparatus 10A, the image forming apparatus 10B transmits an instruction sheet 50 and a list of supported encryption algorithms to the image forming apparatus 10A.

In (S22), the image forming apparatus 10A acquires the instruction sheet 50 and the list of supported encryption algorithms, transmitted from the image forming apparatus 10B. At this time, the image forming apparatus 10A also acquires the list of encryption algorithms supported by the image forming apparatus 10A, from the memory 14. With respect to each encryption algorithm list of the image forming apparatus 10A and the image forming apparatus 10B, scores are given in advance as level information to individual encryption algorithms.

In (S23), the image forming apparatus 10A transmits the instruction sheet 50 and the encryption algorithm list of each of the image forming apparatus 10A and the image forming apparatus 10B, to the server apparatus 60. The acquisition unit 62 acquires the instruction sheet 50 and the encryption algorithm list of each of the image forming apparatus 10A and the image forming apparatus 10B, which are received from the image forming apparatus 10A.

In (S24), the replacement determination unit 64A determines whether or not to replace the encrypted communication function of the image forming apparatus 10B with the encrypted communication function of the image forming apparatus 10A. Specifically, the replacement determination unit 64A generates a comparison table shown in FIG. 10 described above from the encryption algorithm list of each of the image forming apparatus 10A and the image forming apparatus 10B, and makes a determination by using the generated comparison table.

In a case where it is determined that replacement of the encrypted communication function is to be performed using the comparison table, the replacement determination unit 64A instructs the instruction sheet generation unit 64B to generate a necessary instruction sheet. On the other hand, in a case where it is determined that replacement of the encrypted communication function is not to be performed using the comparison table, the replacement determination unit 64A transmits information representing a message notifying that replacement of the encrypted communication function is not to be performed to the image forming apparatus 10A.

In (S25), in accordance with the instruction from the replacement determination unit 64A, the instruction sheet generation unit 64B generates an instruction sheet 52 for executing the Box To Cloud function, as an instruction sheet for a new side, with reference to the information such as the address information of the cloud server 40, the authentication information, the storage destination of the transfer document, the document name at the time of storage, and the like included in the instruction sheet 50. Then, in accordance with an instruction from the replacement determination unit 64A, the instruction sheet generation unit 64B generates an instruction sheet 54 for executing the Box To Box function, as an instruction sheet for an existing side.

In (S26), the confidential box generation instructing unit 64C instructs the image forming apparatus 10A to generate a confidential box 14B. Further, the instruction sheet registration instructing unit 64D transmits the instruction sheet 52 generated above to the image forming apparatus 10A, and instructs it to register the instruction sheet 52. Further, the instruction sheet update instructing unit 64E transmits the instruction sheet 54 generated above to the image forming apparatus 10A, and instructs the image forming apparatus 10A to update the instruction sheet 50 of the image forming apparatus 10B with the instruction sheet 54.

In (S27), the image forming apparatus 10A generates a new confidential box 14B in the memory 14 in accordance with an instruction from the confidential box generation instructing unit 64C.

In (S28), the image forming apparatus 10A registers the instruction sheet 52 received from the server apparatus 60 in the image forming apparatus 10A in accordance with the instruction from the instruction sheet registration instructing unit 64D. By this registration process, the function of transferring the FAX document received in the confidential box 14B to the cloud server 40 is realized.

In (S29), the image forming apparatus 10A transmits the instruction sheet 54 received from the server apparatus 60 to the image forming apparatus 10B, in accordance with the instruction from the instruction sheet update instructing unit 64E. Then, the image forming apparatus 10A instructs the image forming apparatus 10B to update the instruction sheet 50 registered in advance in the image forming apparatus 10B with the instruction sheet 54.

In (S30), the image forming apparatus 10B updates the instruction sheet 50 with the instruction sheet 54 received from the image forming apparatus 10A, in accordance with the instruction from the image forming apparatus 10A. By this updating process, a function of transferring the Fax document received by FAX and stored in the confidential box 15B to confidential box 14B of the image forming apparatus 10A is realized.

Fourth Exemplary Embodiment

For example, there is a possibility that replacement of functions that are used infrequently and that are not used much is performed. On the other hand, in the present exemplary embodiment, an aspect of suppressing the occurrence of replacement of functions that are used infrequently and that are not used much will be described with reference to FIG. 2 described above.

As shown in FIG. 2, the image forming apparatus 10A according to the present exemplary embodiment is provided with the acquisition unit 32 and the replacement unit 34. In the existing image forming apparatus 10B, the use frequency of replaceable functions is stored in advance together with the second level information thereof. The use frequency referred to herein is expressed as the number of times a replaceable function is used in a predetermined period such as one day, one week, one month, or the like. The acquisition unit 32 acquires, from the image forming apparatus 10B, the use frequency of replaceable functions together with the second level information thereof. Then, in a case where the level indicated by the first level information acquired by the acquisition unit 32 is higher than the level indicated by the second level information and the use frequency of the function is higher than a predetermined value, the replacement unit 34 replaces the function of the image forming apparatus 10B with the function of the image forming apparatus 10A. That is, in the case of a function which is used to some extent by the existing image forming apparatus 10B, the function is replaced; and in the case of a function which is not used much, the function is not replaced.

Further, in a case where the level indicated by the first level information is higher than the level indicated by the second level information, the use frequency of the replaceable function is higher than a predetermined value, and the use frequency of the function is increasing, the replacement unit 34 may perform replacement of the function. For example, in the image forming apparatus 10B, in a case where the use frequency of the function in recent months has been increasing, the function is replaced.

Fifth Exemplary Embodiment

In the present exemplary embodiment, a function replacing process in the case where the number of at least one of new image forming apparatuses 10A or existing image forming apparatuses 10B is plural will be described.

Figure 16:
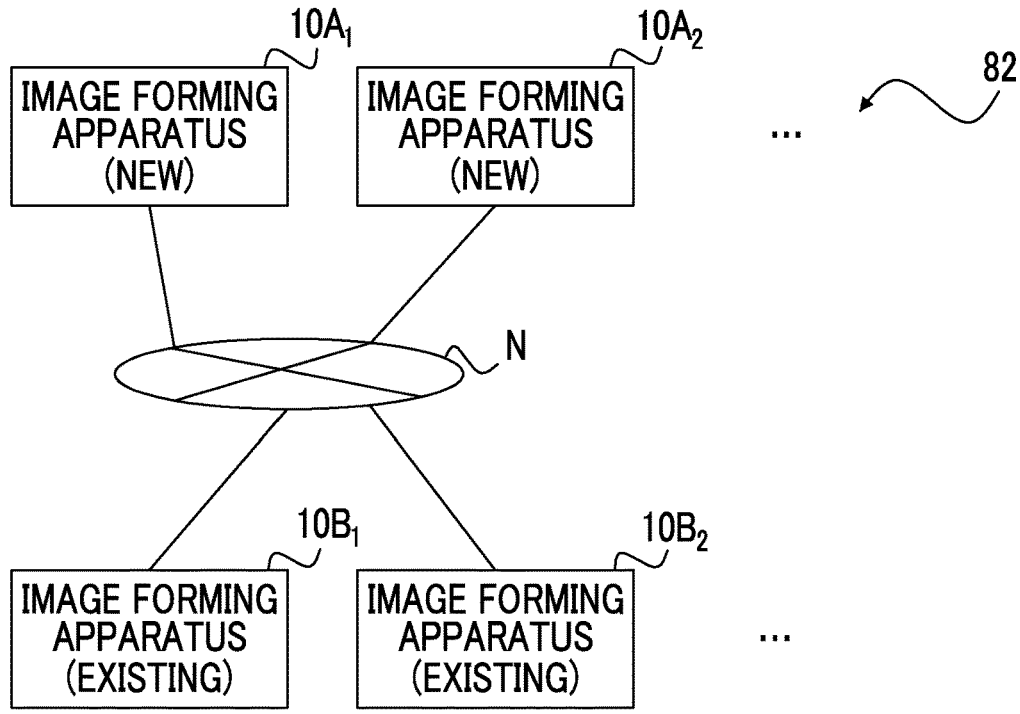
FIG. 16 is a diagram illustrating an example of the configuration of an image forming system according to the fifth exemplary embodiment.

FIG. 16 shows an example of the configuration of an image forming system. 82 according to the fifth exemplary embodiment. As shown in FIG. 16, the image forming system 82 according to the fifth exemplary embodiment includes plural image forming apparatuses $10A_1$, $10A_2$, and . . . and plural image forming apparatuses $10B_1$, $10B_2$, and . . . .

In the present exemplary embodiment, the plural image forming apparatuses $10A_1$, $10A_2$, and . . . are new apparatuses newly connected to the network N, and the plural image forming apparatuses $10B_1$, $10B_2$, and . . . are existing apparatuses which are already connected to the network N.

The image forming apparatus $10A_1$ according to the present exemplary embodiment is provided the acquisition unit 32 and the replacement unit 34, as shown in FIG. 2 described above, similar to the image forming apparatus 10A. The acquisition unit 32 and the replacement unit 34 may be provided in any one of the other new image forming apparatuses $10A_2$, and . . . .

The replacement unit 34 according to the present exemplary embodiment specifies an image forming apparatus having the highest level of function, among the new image forming apparatuses $10A_1$, $10A_2$, and . . . and the existing image forming apparatuses $10A_1$, $10B_2$, and . . . . For this specific method, for example, in the case of the encrypted communication function, the comparison table as shown in FIG. 10 described above may be used. Then, the replacement unit 34 replaces the functions of other image forming apparatuses with the function of the specified image forming apparatus. Specifically, for example, in a case where the image forming apparatus $10A_1$ has the highest level of function, the same function of each of the image forming apparatuses $10A_2$, $10B_1$, $10B_2$, and . . . is replaced with the function of the image forming apparatus $10A_1$.

In this case, the display 16 may display a message notifying that the same function of each of the image forming apparatuses $10A_2$, $10B_1$, $10B_2$, and . . . has been replaced with the function of the image forming apparatus $10A_1$, based on the instruction from the replacement unit 34.

In the above case, it is conceivable that use is concentrated on the image forming apparatus $10A_1$ having the highest level of function.

Therefore, the acquisition unit 32 acquires the use frequency of the function of the image forming apparatus $10A_1$ specified above. In a case where the use frequency obtained by the acquisition unit 32 is higher than a predetermined value, the replacement unit 34 distributes the use of the function of the specified image forming apparatus $10A_1$ to other image forming apparatuses. Here, it is assumed that the use of the function is distributed to other image forming apparatuses having a function within a predetermined level lower than the highest level. More specifically, it is assumed a case where the level of the function of the image forming apparatus $10A_1$ is the highest, and the levels decrease in the order of the image forming apparatus $10A_2$, the image forming apparatus $10B_1$, the image forming apparatus $10B_2$, and . . . . Then, in a case where the level for distribution is set to the second highest level, the use of the function of the image forming apparatus $10A_1$ is distributed to the image forming apparatus $10A_2$ having the second highest level of the same function. How much to distribute the function may be appropriately set.

Sixth Exemplary Embodiment

For example, in a case where the function of the image forming apparatus 10A after replacement of the function becomes unusable due to a failure or the like, the user cannot use the function and inconvenience occurs. On the other hand, in the present exemplary embodiment, an aspect of dealing with inconvenience in a case where the user cannot use the function will be described with reference to FIG. 2 described above.

As shown in FIG. 2, the image forming apparatus 10A according to the present exemplary embodiment is provided with the acquisition unit 32 and the replacement unit 34. Here, the function of the image forming apparatus 10B is replaced with the same function of the image forming apparatus 10A.

In a case where the function of the image forming apparatus 10A after replacing the function becomes unusable, the replacement unit 34 according to the present exemplary embodiment instructs the image forming apparatus 10B to return the replaced function of the image forming apparatus 10B to the same function of the image forming apparatus 10B. Further, the replacement unit 34 replaces the function of the image forming apparatus 10A with the same function of the image forming apparatus 10B. Here, the case where the function of the image forming apparatus 10A cannot be used is, for example, a case where the image forming apparatus 10A is under maintenance, or a case where the image forming apparatus 10A fails. Even in a case where the function of the image forming apparatus 10A is unusable, the controller 12 is in operation, and communication between the image forming apparatus 10A and the image forming apparatus 10B is enabled.

Figure 17:
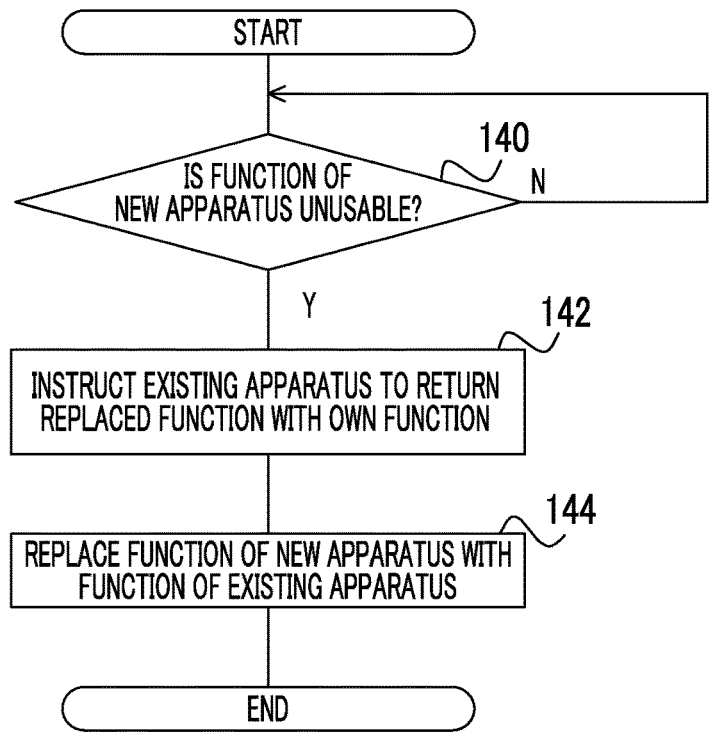
FIG. 17 is a flowchart illustrating an example of a flow of a process after replacement of a function by the replacement processing program according to the sixth exemplary embodiment.

Next, with reference to FIG. 17, the operation of the image forming apparatus 10A in the case where the function after the replacement according to the sixth exemplary embodiment becomes unusable will be described. FIG. 17 is a flowchart illustrating an example of a flow of a process after replacement of a function by the replacement processing program 14A according to the sixth exemplary embodiment.

First, in step 140 of FIG. 17, the replacement unit 34 determines whether or not the function of the image forming apparatus 10A is unusable. In a case where it is determined that the function of the image forming apparatus 10A is unusable (in the case of affirmative determination), the process proceeds to step 142. On the other hand, in a case where it is determined that the function of the image forming apparatus 10A is not unusable (in the case of a negative determination), the process waits in step 140.

In step 142, the replacement unit 34 instructs the existing apparatus (image forming apparatus 10B) to return the replaced function to the same function of the image forming apparatus 10B. In accordance with an instruction from the image forming apparatus 10A, the image forming apparatus 10B performs a process of returning the replaced function to the same function of the image forming apparatus 10B.

In step 144, the replacement unit 34 replaces the function of the image forming apparatus 10A with the same function of the existing apparatus. Thus, the function of the image forming apparatus 10A is replaced with the same function of the image forming apparatus 10B.

In the above description, the case where the function of the image forming apparatus 10A after the function is replaced in the new image forming apparatus 10A and the existing image forming apparatus 10B has become unusable has been described. Even in a case where the number of at least one of new image forming apparatuses 10A or existing image forming apparatuses 10B is plural and the function of the image forming apparatus 10A after the function is replaced becomes unusable, the present exemplary embodiment can be similarly applied.

In the above, the information processing system and the image forming system has been exemplified and described as exemplary embodiments. The exemplary embodiment may be in the form of a program for causing a computer to execute the functions of the respective units included in the information processing system or the image forming system. The exemplary embodiment may be in the form of a storage medium readable by a computer that stores the program.

In addition, the configuration of the information processing system or the image forming system described in each of the above exemplary embodiments is merely an example, and may be changed depending on a situation within a scope not deviating from the gist.

Further, the flow of the process of the program described in each of the above exemplary embodiment is also an example, and unnecessary steps may be deleted, new steps may be added, or processing order may be changed within a scope not deviating from the gist.

Further, in the above exemplary embodiments, the case where the process according to the exemplary embodiment is realized by a software configuration using a computer by executing a program has been described, but the present invention is not limited thereto. The exemplary embodiment may be realized by, for example, a hardware configuration or a combination of a hardware configuration and a software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising a processor configured to:
acquire first level information indicating a level of a function of a first apparatus; second level information indicating a level of the function of a second apparatus, and a use frequency of the function of the second apparatus; and
replace the function of the second apparatus with the function of the first apparatus in response to determining that the level indicated by the first level information is higher than the level indicated by the second level information and the use frequency is higher than a predetermined value,
wherein in a case where the number of at least one of first apparatuses or second apparatuses is plural, the processor specifies the first apparatus or the second apparatus having a highest level of the function, and replaces the function of each of the other apparatuses with the function of the specified first apparatus or second apparatus.

2. The information processing system according to claim 1,
wherein in a case where the level indicated by the first level information is higher than the level indicated by the second level information, the use frequency is higher than the predetermined value, and the use frequency is increasing, the processor replaces the function of the second apparatus with the function of the first apparatus.

3. The information processing system according to claim 2,
wherein in a case where the function of the first apparatus after replacing the function becomes unusable, the processor returns the replaced function of the second apparatus to the function of the second apparatus and replaces the function of the first apparatus with the function of the second apparatus.

4. The information processing system according to claim 3,
wherein the case where the function of the first apparatus becomes unusable is a case where the first apparatus is under maintenance or a case where the first apparatus fails.

5. The information processing system according to claim 2,
wherein the first apparatus further includes a display that displays a message indicating that the function of the second apparatus is replaced with the function of the first apparatus.

6. The information processing system according to claim 1,
wherein the processor further acquires a use frequency of the function of the specified first apparatus or second apparatus, and
wherein in a case where the use frequency is higher than a predetermined value, the processor distributes the use of the function of the specified first apparatus or second apparatus to the other apparatuses having the function within a predetermined level lower than the highest level.

7. The information processing system according to claim 1,
wherein in a case where the function of the first apparatus after replacing the function becomes unusable, the processor returns the replaced function of the second apparatus to the function of the second apparatus and replaces the function of the first apparatus with the function of the second apparatus.

8. The information processing system according to claim 7,
wherein the case where the function of the first apparatus becomes unusable is a case where the first apparatus is under maintenance or a case where the first apparatus fails.

9. The information processing system according to claim 1,
wherein the first apparatus further includes a display that displays a message indicating that the function of the second apparatus is replaced with the function of the first apparatus.

10. The information processing system according to claim 9,
wherein the second apparatus further includes another display that displays the message.

11. The information processing system according to claim 1,
wherein the first apparatus is a new apparatus which is newly connected to the network,
wherein the second apparatus is an existing apparatus which is already connected to the network, and
wherein the new apparatus includes the processor.

12. The information processing system according to claim 1,
wherein the first apparatus is a new apparatus which is newly connected to the network,
wherein the second apparatus is an existing apparatus which is already connected to the network, and
wherein the existing apparatus includes the processor.

13. The information processing system according to claim 1, further comprising:
a server apparatus connected to the network,
wherein the first apparatus is a new apparatus which is newly connected to the network,
wherein the second apparatus is an existing apparatus which is already connected to the network, and
wherein the server apparatus includes the processor.

14. A non-transitory computer readable medium storing a program causing a computer to function as:
the processor of the information processing system according to claim 1.

15. An image forming system comprising a processor configured to:
acquire first level information indicating a level of a function of a first image forming apparatus, second level information indicating a level of the function of a second image forming apparatus, and a use frequency of the function of the second apparatus; and
replace the function of the second image forming apparatus with the function of the first image forming apparatus in response to determining that the level indicated by the first level information is higher than the level indicated by the second level information and the use frequency is higher than a predetermined value,
wherein in a case where the number of at least one of first apparatuses or second apparatuses is plural, the processor specifies the first apparatus or the second apparatus having a highest level of the function, and replaces the function of each of the other apparatuses with the function of the specified first apparatus or second apparatus.

* * * * *